US012282293B2

(12) United States Patent
Sugahara et al.

(10) Patent No.: US 12,282,293 B2
(45) Date of Patent: Apr. 22, 2025

(54) TONER, IMAGE FORMING APPARATUS, AND IMAGE FORMATION METHOD

(71) Applicant: KYOCERA Document Solutions Inc., Osaka (JP)

(72) Inventors: Masanori Sugahara, Osaka (JP); Naruo Yabe, Osaka (JP); Takeshi Arakawa, Osaka (JP); Takeo Mizobe, Osaka (JP); Ryota Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 542 days.

(21) Appl. No.: 17/456,278

(22) Filed: Nov. 23, 2021

(65) Prior Publication Data

US 2022/0163901 A1 May 26, 2022

(30) Foreign Application Priority Data

Nov. 25, 2020 (JP) ................................ 2020-195219

(51) Int. Cl.
*G03G 9/087* (2006.01)
*G03G 9/097* (2006.01)

(52) U.S. Cl.
CPC ....... *G03G 9/0872* (2013.01); *G03G 9/09725* (2013.01); *G03G 9/09766* (2013.01)

(58) Field of Classification Search
CPC ............. G03G 9/0872; G03G 9/09725; G03G 9/09766
See application file for complete search history.

(56) References Cited

U.S. PATENT DOCUMENTS

2009/0029281 A1* 1/2009 Kikushima ........ G03G 9/09725 430/111.3
2010/0261111 A1* 10/2010 Aruga ................ G03G 9/09708 430/105
2017/0261875 A1* 9/2017 Takatsuna ............ G03G 9/1135

FOREIGN PATENT DOCUMENTS

JP 2010-197732 A 9/2010

* cited by examiner

*Primary Examiner* — Peter L Vajda
*Assistant Examiner* — Boone Alexander Evans
(74) *Attorney, Agent, or Firm* — Studebaker Brackett PLLC

(57) ABSTRACT

A toner includes toner particles. The toner particles each include a toner mother particle containing a binder resin and an external additive attached to a surface of the toner mother particle. The external additive includes fluorine-containing particles. The fluorine-containing particles include a fluorine atom at least in surface layers thereof. The amount of the fluorine-containing particles is at least 0.10 parts by mass and no greater than 0.50 parts by mass relative to 100 parts by mass of the toner mother particles. When ultrasonication is performed, a residual amount ratio of remaining fluorine-containing particles is at least 0% by mass and no greater than 20% by mass relative to the amount of the fluorine-containing particles attached to the toner mother particles before the ultrasonication.

7 Claims, 3 Drawing Sheets

TONER, IMAGE FORMING APPARATUS, AND IMAGE FORMATION METHOD

INCORPORATION BY REFERENCE

The present application claims priority under 35 U.S.C. § 119 to Japanese Patent Application No. 2020-195219, filed on Nov. 25, 2020. The contents of this application are incorporated herein by reference in their entirety.

BACKGROUND

The present disclosure relates to a toner, an image forming apparatus, and an image formation method.

An electrographic image forming apparatus typically includes a development device including a developer bearing member (toner bearing member) that bears developer and a layer-thickness limiting member that limits the thickness of a developer layer (toner layer). The developer is divided into a one-component developer that contains only a toner and a two-component developer that contains a toner and a carrier.

The one-component developer is further divided into a magnetic one-component developer of which toner particles include a magnetic powder and a non-magnetic one-component developer of which toner particles include no magnetic powder. In a development process using the non-magnetic one-component developer, the layer-thickness limiting member (e.g., a layer-thickness limiting blade) of the development device is provided in contact with the surface of the toner bearing member. In the following, a development process with a non-magnetic one-component developer using a development device including a layer-thickness limiting member provided in contact with the surface of a toner bearing member may be referred to as "non-magnetic one-component development process".

In image formation by the non-magnetic one-component development process, toner tends to readily adhere to the layer-thickness limiting member due to the layer-thickness limiting member being in contact with the surface of the toner bearing member. Once the toner adheres to the layer-thickness limiting member, image defects (specific examples include streaks) tend to be caused in an image formed with the toner.

In order to inhibit production of image defects in an image formed with the toner, a toner in one example uses polytetrafluoroethylene particles as external additive particles.

SUMMARY

A toner according to an aspect of the present disclosure includes toner particles. The toner particles each include a toner mother particle containing a binder resin and an external additive attached to a surface of the toner mother particle. The external additive includes fluorine-containing particles. The fluorine-containing particles include a fluorine atom at least in surface layers thereof. An amount of the fluorine-containing particles is at least 0.10 parts by mass and no greater than 0.50 parts by mass relative to 100 parts by mass of the toner mother particles. When ultrasonication is performed, a residual amount ratio of remaining fluorine-containing particles is at least 0% by mass and no greater than 20% by mass relative to the amount of the fluorine-containing particles attached to the toner mother particles before the ultrasonication. The ultrasonication is application of ultrasonic oscillation at an output of 200 W, a frequency of 28 kHz, and an amplitude of 25 μm for 5 minutes in 500 mL of a water-based dispersion containing 5 g of the toner and 50 g of a nonionic surfactant. The remaining fluorine-containing particles are fluorine-containing particles of the fluorine-containing particles remaining attached to the toner mother particles without detachment from the toner mother particles after the ultrasonication.

An image forming apparatus according to an aspect of the present disclosure includes an image bearing member and a development device that develops an electrostatic latent image formed on a surface of the image bearing member by supplying a non-magnetic one-component developer to the electrostatic latent image. The non-magnetic one-component developer is the toner according to the present disclosure. The development device includes a toner bearing member that bears the aforementioned toner and a toner layer-thickness limiting member that limits thickness of a toner layer formed with the toner. The development device supplies the toner to the electrostatic latent image while forming the toner layer using the layer-thickness limiting member in contact with the toner bearing member.

An image formation method according to an aspect of the present disclosure is an image formation method using the toner according to the present disclosure as a non-magnetic one-component developer, and includes forming an electrostatic latent image and developing described below.

In the forming an electrostatic latent image, an electrostatic latent image is formed on a surface of an image bearing member. In the developing, the electrostatic latent image is developed by supplying the toner to the electrostatic latent image while forming a toner layer formed with the toner using a layer-thickness limiting member in contact with a toner bearing member.

DETAILED DESCRIPTION

Figure 1:
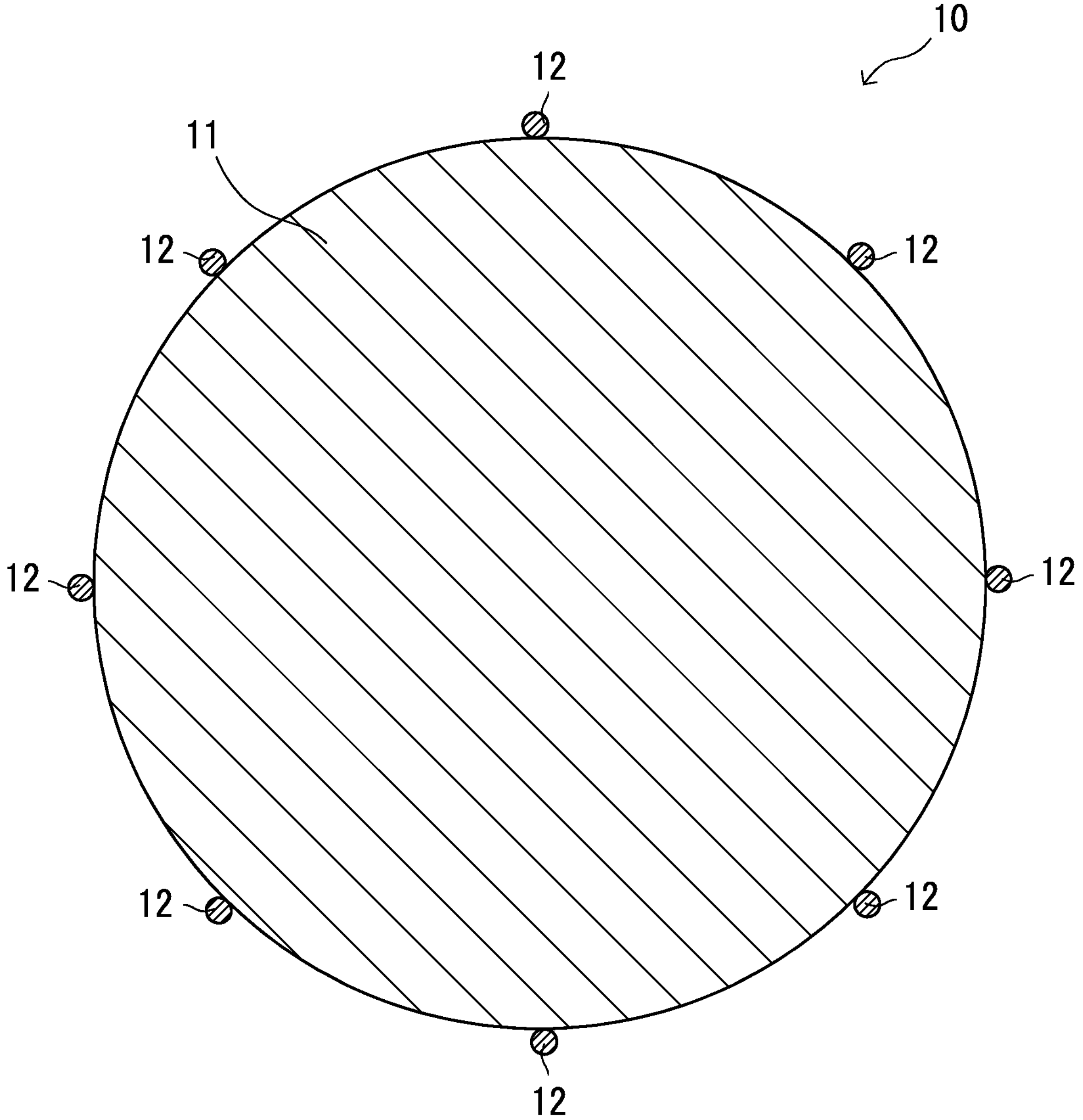
FIG. 1 is a diagram illustrating an example of the sectional structure of a toner particle included in a toner according to a first embodiment of the present disclosure.

The following describes preferable embodiments of the present disclosure. The terms used in the present specification will be described first. "Fluororesin" refers to a resin containing a fluorine atom. "Constituent resin" refers to a resin constituting resin particles. "Fluororesin particles" refers to resin particles of which constituent resin is a fluororesin. A toner refers to a collection (e.g., a powder) of toner particles. An external additive refers to a collection (e.g., a powder) of external additive particles. Unless otherwise stated, results (e.g., values indicating shapes or properties) of evaluations performed on a powder (more specifically, a powder of toner particles or a powder of external additive particles) each are a number average of measurements made with respect to an appropriate number of particles of the powder.

Measurements for volume median diameter ($D_{50}$) of particles (more specifically, a powder of particles) are median diameters in terms of volume as measured using a laser diffraction/light scattering-type particle size distribution analyzer ("LA-950", product by HORIBA, Ltd.) unless otherwise stated. Unless otherwise stated, the number average particle diameter of a powder is the number average of equivalent circle diameters (Heywood diameters: diameters of circles with the same areas as projected areas of the respective primary particles) of 100 primary particles of the powder as measured using a scanning electron microscope ("JSM-7401F", product of JEOL Ltd.) and image analysis software ("WinROOF", product of MITANI CORPORATION). Note that the number average primary particle diameter of particles refers to a number average primary particle diameter of the particles in a powder state (number average primary particle diameter of the powder) unless otherwise stated.

Strength of chargeability corresponds to ease of triboelectric charging unless otherwise stated. For example, a measurement target (e.g., a toner) is triboelectrically charged by mixing and stirring the measurement target with a standard carrier (standard carrier for negatively chargeable toner use: N-01, standard carrier for positively chargeable toner use: P-01) provided by The Imaging Society of Japan. The amount of charge of the measurement target is measured using for example a compact toner draw-off charge measurement system ("MODEL 212HS", product of TREK, INC.) before and after being triboelectrically charged. A larger change in the amount of charge between before and after triboelectrical charging indicates stronger chargeability of the measurement target.

"Silica base particles" refer to silica particles not subjected to treatment (surface treatment) for fluorine atom introduction. In the present specification, both silica particles obtained by performing the surface treatment on the silica base particles and the silica base particles may be referred to as "silica particles".

In the following description, the term "-based" may be appended to the name of a chemical compound in order to form a generic name encompassing both the chemical compound itself and derivatives thereof. When the term "-based" is appended to the name of a chemical compound to form a generic name of a polymer, it means that a repeating unit of the polymer is derived from the chemical compound or a derivative thereof.

First Embodiment: Toner

A toner according to a first embodiment of the present disclosure can be favorably used as a positively chargeable toner for development of electrostatic latent images, for example. The toner according to the first embodiment is a collection (e.g., a powder) of toner particles (particles having the later-described features). The toner of the first embodiment is a non-magnetic one-component developer, for example. The non-magnetic one-component developer is charged for example to a positive polarity by friction with a toner bearing member or a layer-thickness limiting member in a development device.

The toner particles included in the toner of the first embodiment each include a toner mother particle containing a binder resin and an external additive attached to the surface of the toner mother particle. The external additive includes fluorine-containing particles. The fluorine-containing particles include a fluorine atom at least in the surface layers thereof. The amount of the fluorine-containing particles is at least 0.10 parts by mass and no greater than 0.50 parts by mass relative to 100 parts by mass of the toner mother particles. When ultrasonication is performed, the residual amount ratio of remaining fluorine-containing particles is at least 0% by mass and no greater than 20% by mass relative to the amount of the fluorine-containing particles attached to the toner mother particles before the ultrasonication. The ultrasonication is application of ultrasonic oscillation at an output of 200 W, a frequency of 28 kHz, and an amplitude of 25 μm for 5 minutes in 500 mL of a water-based dispersion containing 5 g of the toner of the first embodiment and 50 g of a nonionic surfactant. The remaining fluorine-containing particles are fluorine-containing particles of the fluorine-containing particles remaining attached to the toner mother particles without detachment from the toner mother particles after the ultrasonication.

In the following, the amount (unit: parts by mass) of the fluorine-containing particles relative to 100 parts by mass of the toner mother particles may be referred to as "fluorine attachment amount". Furthermore, ultrasonication to apply ultrasonic oscillation at an output of 200 W, a frequency of 28 kHz, and an amplitude of 25 μm for 5 minutes in 500 mL of a water-based dispersion containing 5 g of a toner and 50 g of a nonionic surfactant may be referred to as "specific ultrasonication". Also, the residual amount ratio (unit: % by mass) of the remaining fluorine-containing particles remaining attached to the toner mother particles without detachment from the toner mother particles after the specific ultrasonication relative to the amount of the fluorine-containing particles attached to the toner mother particles before the specific ultrasonication may be referred to as "fluorine attachment rate". The fluorine attachment rate serves as an indicator as to detachability (readiness of detachment of the fluorine-containing particles from the toner mother particles) of the fluorine-containing particles. That is, a smaller fluorine attachment rate indicates that the fluorine-containing particles tend to more readily detach from the toner mother particles. A fluorine attachment rate measurement method is the same as a method described later in Examples or a method conforming thereto.

Use of the toner of the first embodiment having the above features can inhibit production of image defects in image formation by the non-magnetic one-component development process while low-temperature fixability can be ensured. The reasons thereof are presumed as follows.

In the toner of the first embodiment, the external additive includes fluorine-containing particles. The fluorine-containing particles contain a fluorine atom in the surface layers thereof. As such, friction force between the fluorine-containing particles and other materials is relatively small. Furthermore, the toner of the first embodiment has a fluorine attachment rate of at least 0% by mass and no greater than 20% by mass. This tends to lead detachment of quite a lot of the fluorine-containing particles from the toner mother particles. Therefore, in the toner of the first embodiment, the fluorine-containing particles detached from the toner mother particles adheres to a layer-thickness limiting member in a development device, resulting in tendency for the friction force between the toner and the layer-thickness limiting member to be relatively small. In addition, the toner of the first embodiment has a fluorine attachment amount of at least 0.10 parts by mass. As such, the fluorine-containing particles in an amount sufficient to reduce the friction force between the toner particles and the layer-thickness limiting member can be supplied to the layer-thickness limiting member. From the above, the toner (e.g., the toner from which a portion of the fluorine-containing particles has detached) of the first embodiment tends to hardly adhere to the layer-thickness limiting member in image formation by the non-magnetic one-component development process. Therefore, in image formation by the non-magnetic one-component development process, production of image defects (more specific examples include streaks) resulting from toner adhesion to the layer-thickness limiting member can be inhibited in an image formed with the toner of the first embodiment.

Furthermore, an excessively large fluorine attachment rate tends to excessively increase the amount of toner forming a toner layer. By contrast, the toner of the first embodiment has a fluorine attachment rate of no greater than 20% by mass. As such, the toner of the first embodiment has an upper limit of the fluorine attachment rate to the extent that the amount of the toner forming the toner layer is not excessively increased. Therefore, production of image defects (specific examples include fogging) resulting from an excessive increase in the amount of toner forming the toner layer can be inhibited in an image formed with the toner of the first embodiment.

As described above, use of the toner of the first embodiment can inhibit production of image defects in image formation by the non-magnetic one-component development process because image defects resulting from adhesion of the toner to the layer-thickness limiting member and image defects resulting from an excessive increase in the amount of toner forming a toner layer can be inhibited.

When an excessive amount of the fluorine-containing particles remain in toner fixing, it may be difficult to ensure low-temperature fixability of the toner. By contrast, the toner of the first embodiment has a fluorine attachment rate of no greater than 20% by mass and a fluorine attachment amount of no greater than 0.50 parts by mass. As such, the toner of the first embodiment has an upper limit of the fluorine attachment rate and an upper limit of the fluorine attachment amount to the extent that the amount of the fluorine-containing particles is not excessively increased in toner fixing. Therefore, low-temperature fixability of the toner of the first embodiment can be ensured.

In a case in which the toner of the first embodiment is used as a non-magnetic one-component developer for an image forming apparatus (also referred to below as cleaning blade-equipped image forming apparatus) equipped with a cleaning blade as a cleaning member for cleaning the surface of an image bearing member, the toner of the first embodiment has excellent filming resistance. This is because friction force between the cleaning blade and the image bearing member (e.g., a photosensitive drum) can be adjusted in an appropriate range due to the toner of the first embodiment having a fluorine attachment amount of at least 0.10 parts by mass and no greater than 0.50 parts by mass and a fluorine attachment rate of at least 0% by mass and no greater than 20% by mass. For the same reason as above, in a case in which the toner of the first embodiment is used as a non-magnetic one-component developer for the cleaning blade-equipped image forming apparatus, abrasion of the surface (e.g., the surface of a photosensitive layer) of the image bearing member can be inhibited.

In the first embodiment, the fluorine attachment amount is preferably at least 0.10 parts by mass and no greater than 0.20 parts by mass in order to further inhibit production of image defects in image formation by the non-magnetic one-component development process while further easily ensuring low-temperature fixability of the toner.

In the first embodiment, the fluorine attachment rate is preferably at least 0% by mass and no greater than 8% by mass in order to further inhibit production of image defects in image formation by the non-magnetic one-component development process while further easily ensuring low-temperature fixability of the toner. In particular, in a case in which the toner of the first embodiment is a positively chargeable toner, the toner can have excellent anti-fogging property as a result of the fluorine attachment rate being set to at least 0% by mass and no greater than 8% by mass.

In order to further inhibit production of image defects in image formation by the non-magnetic one-component development process while further easily ensuring low-temperature fixability of the toner in the first embodiment, the fluorine-containing particles have a number average primary particle diameter of preferably at least 50 nm and no greater than 500 nm, and more preferably at least 50 nm and no greater than 85 nm.

The toner particles included in the toner of the first embodiment may be toner particles with no shell layers or toner particles (also referred to below as capsule toner particles) with shell layers. The toner mother particles of the capsule toner particles each include a toner core containing a binder resin and a shell layer covering the surface of the toner core. The shell layer contains a resin. For example, both high-temperature preservability and low-temperature fixability of the toner can be achieved by covering toner cores that melt at low temperature with shell layers with excellent heat resistance. An additive may be dispersed in the resin constituting the shell layers. The shell layers may cover the entire surfaces of the toner cores or may partially cover the surfaces of the toner cores.

In the first embodiment, the toner mother particles may further contain an internal additive (e.g., at least one of a colorant, a releasing agent, and a charge control agent) as necessary in addition to the binder resin.

Details of the toner of the first embodiment will be described below with reference to an accompanying drawing as appropriate. Note that the drawing schematically illustrates elements of configuration in order to facilitate understanding and properties of elements of configuration illustrated in the drawing, such as size, shape, and number thereof, may differ from actual properties thereof in order to facilitate preparation of the drawing.

[Structure of Toner Particles]

With reference to FIG. 1, the structure of each toner particle included in the toner of the first embodiment will be described below. FIG. 1 is a diagram illustrating an example of the sectional structure of a toner particle included in the toner of the first embodiment.

A toner particle 10 illustrated in FIG. 1 includes a toner mother particle 11 containing a binder resin and an external additive attached to the surface of the toner mother particle 11. The external additive includes fluorine-containing particles 12 as external additive particles. The fluorine-containing particles 12 include a fluorine atom at least in surface layers thereof.

The amount (fluorine attachment amount) of the fluorine-containing particles 12 is at least 0.10 parts by mass and no greater than 0.50 parts by mass relative to 100 parts by mass of the toner mother particles 11. Furthermore, a powder (toner) of the toner particles 10 has a fluorine attachment rate of at least 0% by mass and no greater than 20% by mass.

Preferably, the toner mother particles 11 have a volume median diameter ($D_{50}$) of a least 4 μm and no greater than 9 μm in order that the toner is suitable for image formation.

An example of the structure of the toner particle included in the toner of the first embodiment has been described so far with reference to FIG. 1.

[Constituent Elements of Toner Particles]

Constituent elements of the toner particles included in the toner of the first embodiment will be described next.

(Binder Resin)

The binder resin accounts for no less than 70% by mass of all components of the toner mother particles, for example. Properties of the binder resin are therefore thought to have great influence on overall properties of the toner mother particles. In terms of providing excellent low-temperature fixability to the toner, the toner mother particles preferably contain a thermoplastic resin as the binder resin and further preferably contain the thermoplastic resin at a percentage content of at least 85% by mass relative to the total of the binder resin. Examples of the thermoplastic resin include styrene-based resins, acrylic acid ester-based resins, olefin-based resins (specific examples include polyethylene resin and polypropylene resin), vinyl resins (specific examples include vinyl chloride resin, polyvinyl alcohol, vinyl ether resin, and N-vinyl resin), polyester resins, polyamide resins, and urethane resins. Alternatively, a copolymer of any of the resins listed above, that is, a copolymer (specific examples include a styrene-acrylic acid ester-based resin or a styrene-butadiene-based resin) of any of the resins listed above into which any repeating unit has been introduced may be used as the binder resin.

A thermoplastic resin can be obtained by addition polymerization, copolymerization, or condensation polymerization of at least one thermoplastic monomer. Note that the thermoplastic monomer is a monomer (specific examples include an acrylic acid ester-based monomer and a styrene-based monomer) that forms a thermoplastic resin by homopolymerization, or a monomer (specific examples include a combination of a polyhydric alcohol and a polybasic carboxylic acid that form a polyester resin by condensation polymerization) that forms a thermoplastic resin by condensation polymerization.

In order that the toner has excellent low-temperature fixability, the toner mother particles preferably contain a polyester resin as the binder resin, and more preferably contain the polyester resin at a percentage content of at least 90% by mass and no greater than 100% by mass relative to the total mass of the binder resin. The polyester resin can be obtained by condensation polymerization of at least one polyhydric alcohol and at least one polycarboxylic acid. Examples of a polyhydric alcohol used for synthesis of the polyester resin include dihydric alcohols (specific examples include aliphatic diols and bisphenols) and tri or higher-hydric alcohols listed below. Examples of a polybasic carboxylic acid used for synthesis of the polyester resin include dibasic carboxylic acids and tri- or higher-basic carboxylic acids listed below. Note that a polybasic carboxylic acid derivative (specific examples include a polybasic carboxylic acid anhydride and a polybasic carboxylic acid halide) that can form an ester bond through condensation polymerization may be used instead of the polybasic carboxylic acid.

Preferable examples of the aliphatic diols include diethylene glycol, triethylene glycol, neopentyl glycol, 1,2-propanediol, α,ω-alkanediols (specific examples include ethylene glycol, 1,3-propanediol, 1,4-butanediol, 1,5-pentanediol, 1,6-hexanediol, 1,7-heptanediol, 1,8-octanediol, 1,9-nonanediol, and 1,12-dodecanediol), 2-butene-1,4-diol, 1,4-cyclohexanedimethanol, dipropylene glycol, polyethylene glycol, polypropylene glycol, and polytetramethylene glycol.

Preferable examples of the bisphenols include bisphenol A, hydrogenated bisphenol A, bisphenol A ethylene oxide adduct, and bisphenol A propylene oxide adduct.

Preferable examples of the tri- or higher-hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Preferable examples of the dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, 1,10-decanedicarboxylic acid, succinic acid, alkyl succinic acids (specific examples include n-butylsuccinic acid, isobutylsuccinic acid, n-octylsuccinic acid, n-dodecylsuccinic acid, and isododecylsuccinic acid), and alkenyl succinic acids (specific examples include n-butenylsuccinic acid, isobutenylsuccinic acid, n-octenylsuccinic acid, n-dodecenylsuccinic acid, and isododecenylsuccinic acid).

Preferable examples of the tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylene-carboxylpropane, 1,2,4-cyclohexanetricarboxylic acid, tetra(methylenecarboxyl)methane, 1,2,7,8-octanetetracarboxylic acid, pyromellitic acid, and Empol trimer acid.

(Colorant)

The toner mother particles may contain a colorant. The colorant can be a known pigment or dye that matches the color of the toner. In order to form high-quality images using the toner, the amount of the colorant is preferably at least 1 part by mass and no greater than 20 parts by mass relative to 100 parts by mass of the binder resin.

The toner mother particles may contain a black colorant. An example of the black colorant is carbon black. The black colorant may be a colorant whose color is adjusted to black using a yellow colorant, a magenta colorant, and a cyan colorant.

The toner mother particles may contain a non-black colorant. Examples of the non-black colorant include a yellow colorant, a magenta colorant, and a cyan colorant.

At least one compound selected from the group consisting of a condensed azo compound, an isoindolinone compound, an anthraquinone compound, an azo metal complex, a methine compound, and an arylamide compound can be used as the yellow colorant. Examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G and C.I. Vat Yellow.

At least one compound selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound can be used as the magenta colorant. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

At least one compound selected from the group consisting of a copper phthalocyanine compound, an anthraquinone compound, and a basic dye lake compound can be used as the cyan colorant. Examples of the cyan colorant include C.I. Pigment Blue (1, 7, 15, 15:1, 15:2, 15:3, 15:4, 60, 62, or 66), Phthalocyanine Blue, C.I. Vat Blue, and C.I. Acid Blue.

(Releasing Agent)

The toner mother particles may contain a releasing agent. The releasing agent is used for example for the purpose to obtain a toner excellent in offset resistance. In order that the toner has excellent offset resistance, the amount of the releasing agent is preferably at least 1 part by mass and no greater than 20 parts by mass relative to 100 parts by mass of the binder resin.

Examples of the releasing agent include ester waxes, polyolefin waxes (specific examples include polyethylene wax and polypropylene wax), microcrystalline wax, fluororesin wax, Fischer-Tropsch wax, paraffin wax, candelilla wax, montan wax, and castor wax. Examples of the ester waxes include natural ester waxes (specific examples include caranuba wax and rice wax) and synthetic ester waxes. In the first embodiment, one releasing agent may be used independently or a plurality of releasing agents may be used in combination.

In order to improve compatibility between the binder resin and the releasing agent, a compatibilizer may be added to the toner mother particles.

(Charge Control Agent)

The toner mother particles may contain a charge control agent. The charge control agent is used for the purpose to obtain a toner excellent in charge stability or charge rise characteristic, for example. The charge rise characteristic of a toner is an indicator as to whether or not the toner can be charged to a specific charging level in a short period of time.

As a result of the toner mother particles containing a positively chargeable charge control agent, cationic strength (positive chargeability) of the toner mother particles can be increased. By contrast, as a result of the toner mother particles containing a negatively chargeable charge control agent, anionic strength (negative chargeability) of the toner mother particles can be increased.

Examples of the positively chargeable charge control agent include: azine compounds such as pyridazine, pyrimidine, pyrazine, 1,2-oxazine, 1,3-oxazine, 1,4-oxazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline; direct dyes such as Azine Fast Red FC, Azine Fast Red 12BK, Azine Violet BO, Azine Brown 3G Azine Light Brown GR, Azine Dark Green BH/C, Azine Deep Black EW, and Azine Deep Black 3RL: acid dyes such as Nigrosine BK. Nigrosine NB, and Nigrosine Z; alkoxylated amine; alkyl amide; quaternary ammonium salts such as benzyldecylhexylmethyl ammonium chloride, decyltrimethyl ammonium chloride, 2-(methacryloyloxy)ethyl trimethylammonium chloride, and dimethylaminopropyl acrylamide methyl chloride quaternary salt; and resins having a quaternary ammonium cationic group. Any one of the charge control agents listed above may be used independently or two or more charge control agents listed above may be used in combination.

An example of the negatively chargeable charge control agent is an organic metal complex that is a chelate compound. At least one selected from the group consisting of a metal acetylacetonate complex, a salicylic acid-based metal complex, and a salt of any of these is preferable as the organic metal complex.

In order that the toner has excellent charge stability, the content ratio of the charge control agent is preferably at least 0.1 parts by mass and no greater than 20 parts by mass relative to 100 parts by mass of the binder resin.

(External Additive)

The toner particles included in the toner of the first embodiment include an external additive attached to the surfaces of the toner mother particles. The external additive includes one type or two or more types of fluorine-containing particles as the external additive particles. An additive (a specific example is an emulsifier) may be attached to a part of each surface of the fluorine-containing particles.

Examples of the fluorine-containing particles include fluororesin particles and silica particles (also referred to below as "fluorine-introduced silica particles") subjected to treatment for fluorine atom introduction. The fluorine-introduced silica particles each include a silica base particle and a surface-treated layer present on the surface of the silica base particle. The surface-treated layers of the fluorine-introduced silica particles are layers obtained by treatment with a surface treatment agent (also referred to below as "fluorine-introducing treatment agent) for fluorine atom introduction. That is, the surface-treated layers of the fluorine-introduced silica particles contain a fluorine atom derived from the fluorine-introducing treatment agent.

In order to further easily ensure low-temperature fixability of the toner, the fluorine-containing particles are preferably fluororesin particles. Alternatively, the fluorine-containing particles are preferably the fluorine-introduced silica particles in order to favorably maintain fluidity of the toner.

No particular limitations are placed on a production method of the fluorine-containing particles. Alternatively, commercially available fluorine-containing particles may be used in the toner of the first embodiment. The fluororesin particles and the fluorine-introduced silica particles that are examples of the fluorine-containing particles will be described in detail below.

Examples of a fluororesin constituting the fluororesin particles include polytetrafluoroethylene (also referred to below as "PTFE"), perfluoro alkoxy alkane (also referred to below as "PFA"), polychlorotrifluoroethylene, polyvinylidene fluoride, polydichlorodifluoroethylene, a tetrafluoroethylene-perfluoroalkylvinylether copolymer, a tetrafluoroethylene-hexafluoropropylene copolymer, a tetrafluoroethylene-ethylene copolymer, a tetrafluoroethylene-hexafluoropropylene-perfluoroalkylvinylether copolymer, and a tetrafluoroethylene-perfluoroalkoxyethylene copolymer. One or two or more fluororesins may be used as the fluororesin constituting the fluororesin particles.

In order to further inhibit production of streaks, the fluororesin particles are preferably PTFE particles (particles of which constituent resin is PTFE) or PFA particles (particles of which constituent resin is PFA).

An example of a production method of the fluororesin particles will be described below. Water (a specific example is ion exchange water), an emulsifier (a specific example is ammonium perfluorohexanoate), and a wax (a specific example is paraffin wax) are charged into an autoclave first. Next, the autoclave is purged with a nitrogen gas and a raw material gas (a specific example is a tetrafluoroethylene gas) of a fluororesin while the internal temperature of the autoclave is kept at a specific temperature (e.g., a temperature of at least 40° C. and no higher than 90° C.).

Subsequently, an aqueous solution (specific example include an aqueous solution of ammonium persulfate and an aqueous solution of disuccinic acid peroxide) of a polymerization initiator is injected into the autoclave. Thereafter, the material gas of the fluororesin is continuously supplied into the autoclave for polymerization reaction. During polymerization reaction, the autoclave contents are continuously stirred at a rotational speed of at least 200 rpm and no greater than 300 rpm while the internal temperature of the autoclave is kept at a specific temperature (e.g., a temperature of at least 40° C. and no higher than 90° C.). After a specific time (e.g., a time of 30 minutes or longer and 150 minutes or shorter) elapses from the start of injection of the aqueous solution of the polymerization initiator (stirring start of the autoclave contents), supply of the material gas is stopped and stirring of the autoclave contents is stopped to cease the polymerization reaction.

Subsequently, precipitation is performed. Specifically, concentrated nitric acid is added first to a dispersion (the autoclave contents) after the polymerization reaction and the dispersion to which the concentrated nitric acid has been added is stirred at a rotational speed of at least 200 rpm and no greater than 600 rpm for a specific time (e.g., a time of 30 minutes or longer and 2 hours or shorter) for polymer precipitation. Next, the dispersion after precipitation is solid-liquid separated and the resultant solid is dried. In the manner described above, a powder of the fluororesin particles is obtained.

The number average primary particle diameter of the fluororesin particles can be adjusted for example by changing at least one of the time (a time to stir the autoclave contents) from an injection start of the aqueous solution of the polymerization initiator to a supply stop of the material gas, and the rotational speed (stirring speed) in stirring the dispersion in precipitation in the above-described example of the production method of the fluororesin particles.

The fluorine-introducing treatment agent for producing the fluorine-introduced silica particles is preferably a fluorine-containing silane coupling agent or a fluorine-modified silicone oil.

Examples of the fluorine-containing silane coupling agent include 3,3,3-trifluoropropyltrimethoxysilane, 3,3,3-trifluoropropyltriacetoxysilane, dimethyl-3,3,3-trifluoropropylmethoxysilane, and tridecafluoro-1,1,2,2-tetrahydrooctyl triethoxysilane.

Examples of a commercially available fluorine-modified silicone oil include silicone oils (product names: KF-99, KF-96, KF-56, KF-412, and FL-100) produced by Shin-Etsu Chemical Co., Ltd.

No particular limitations are placed on a production method of the fluorine-introduced silica particles, and any production method that includes a known surface treatment process can be employed according to a to-be-used fluorine-introducing treatment agent.

In order to further inhibit production of image defects in image formation by the non-magnetic one-component development process while further easily ensuring low-temperature fixability of the toner, it is preferable to satisfy the following condition 1 and it is further preferable to satisfy the following condition 2.

Condition 1: The fluorine-containing particles are PTFE particles or PFA particles and the fluorine attachment amount is at least 0.10 parts by mass and no greater than 0.20 parts by mass.

Condition 2: Condition 1 is satisfied and the fluorine attachment rate is at least 0% by mass and no greater than 8% by mass.

The external additive may include only the fluorine-containing particles as the external additive particles or further include additional external additive particles in addition to the fluorine-containing particles. In order to favorably maintain fluidity of the toner, the additional external additive particles are preferably inorganic particles, and more preferably silica particles.

The additional external additive particles may be surface-treated. For example, in a case in which silica particles are used as the additional external additive particles, either or both hydrophobicity and positive chargeability may be provided to the surfaces of the silica particles using a surface treatment agent other than the fluorine-introducing treatment agent.

In order to allow the external additive to sufficiently exhibit its function while inhibiting detachment of the external additive from the toner mother particles, the amount of the external additive (where additional external additive particles are used, the total amount of the fluorine-containing particles and the additional external additive) is preferably at least 0.10 parts by mass and no greater than 10.00 parts by mass relative to 100 parts by mass of the toner mother particles.

[Toner Production Method]

A preferable production method of the toner of the first embodiment will be described next.

(Toner Mother Particle Preparation)

First, the toner mother particles are prepared by an aggregation method or a pulverization method.

The aggregation method includes an aggregation process and a coalescence process, for example. In the aggregation process, fine particles containing the components of the toner mother particles are caused to aggregate in an aqueous medium to form aggregated particles. In the coalescence process, the components contained in the aggregated particles are caused to coalesce in the aqueous medium to form the toner mother particles.

The pulverization method will be described next. The pulverization method can make it relatively easy to prepare toner mother particles and can reduce production cost. In preparation of the toner mother particles by the pulverization method, toner mother particle preparation includes a melt-kneading process and a pulverizing process, for example. The toner mother particle preparation may further include a mixing process before the melt-kneading process. Alternatively or additionally, the toner mother particle preparation may further include at least one of a finely pulverizing process and a classifying process after the pulverizing process.

In the mixing process, the binder resin and an internal additive added as necessary are mixed to yield a mixture. In the melt-kneading process, a toner material is melted and kneaded to yield a melt-kneaded product. The mixture yielded in the mixing process is used as the toner material, for example. In the pulverizing process, the resultant melt-kneaded product is cooled to for example room temperature (25° C.) and then pulverized to yield a pulverized product. When the pulverized product yielded in the pulverizing process is needed to be reduced in diameter, a process of further pulverizing the pulverized product (finely pulverizing process) may be performed. In order to average the particle diameter of the pulverized product, a process of classifying the yielded pulverized product (classifying process) may be performed. Through the above processes, toner mother particles that are the pulverized product are obtained.

(External Additive Addition)

Thereafter, the toner mother particles prepared as above and an external additive are mixed using a mixer to attach the external additive to the surfaces of the toner mother particles. The external additive includes at least the fluorine-containing particles. The mixer may be an FM mixer (product of Nippon Coke & Engineering Co., Ltd.), for example.

In a case in which additional external additive particles are used, the external additive addition preferably includes a process (first external additive addition process) of mixing the toner mother particles and the additional external additive particles using a mixer, and a process (second external additive addition process) of adding the fluorine-containing particles to the materials (a mixture of the toner mother particles and the additional external additive particles) in the mixer after the first external additive addition process and further mixing the materials in the mixer.

The fluorine attachment amount can be adjusted by changing the amount of the fluorine-containing particles charged into the mixer. The fluorine attachment rate can be adjusted for example by changing a mixing time (where the additional external additive particles are used, a mixing time in the second external additive addition process) in the external additive addition. In the manner described above, the toner including the toner particles is produced.

Second Embodiment: Image Forming Apparatus

Figure 2:
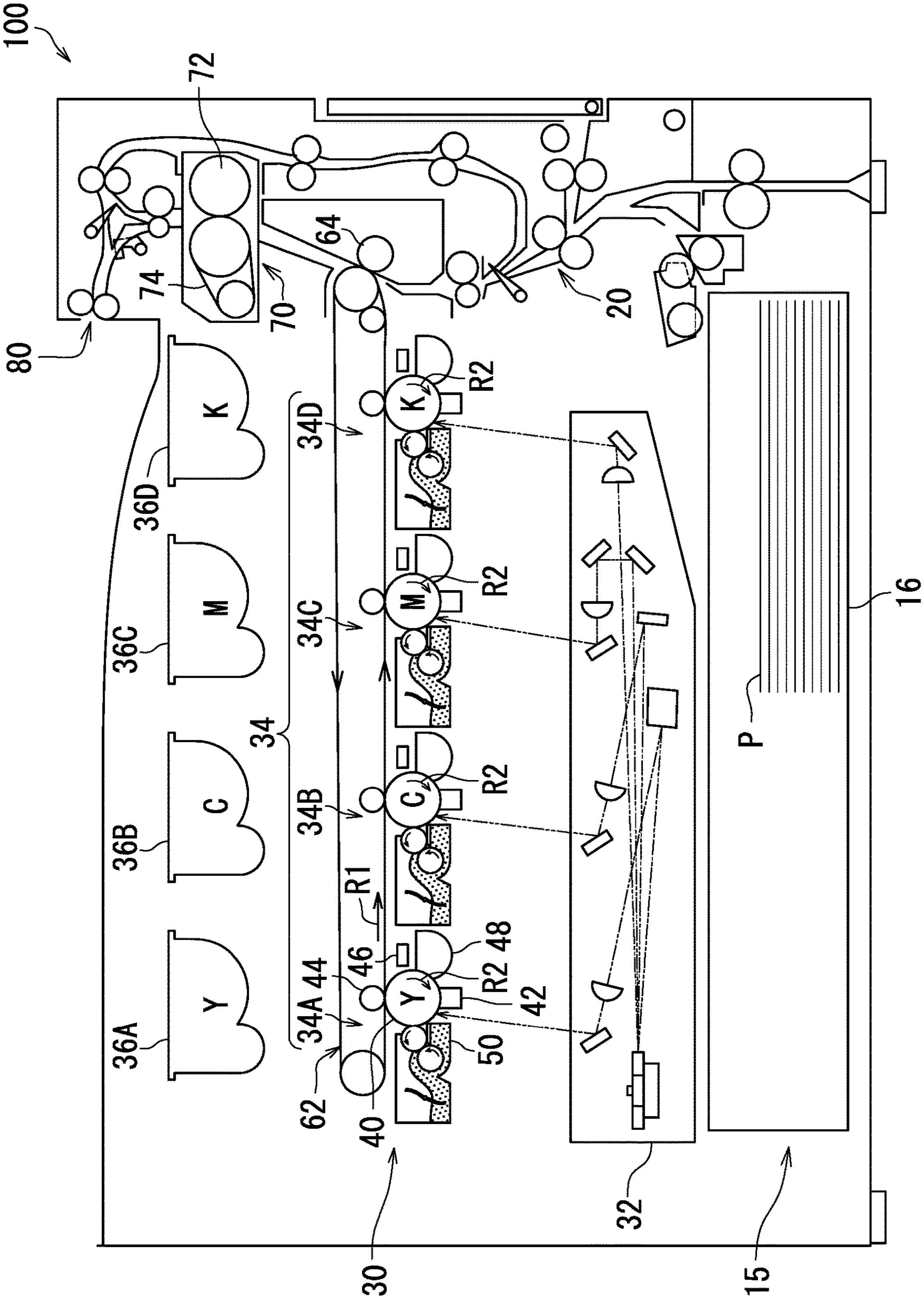
FIG. 2 is a diagram illustrating an example of the configuration of an image forming apparatus according to a second embodiment of the present disclosure.
Figure 3:
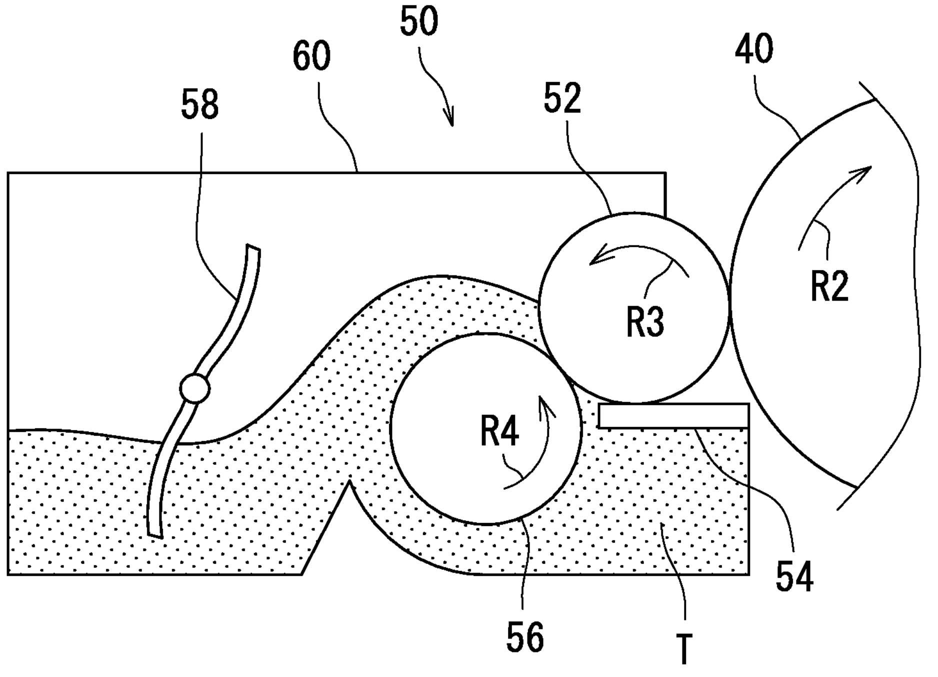
FIG. 3 is a diagram illustrating the configuration of a development device included in the image forming apparatus in FIG. 2.

With reference to the accompanying drawings, an image forming apparatus according to a second embodiment of the present disclosure will be described next. FIG. 2 to be referenced is a diagram illustrating an example of the configuration of the image forming apparatus according to the second embodiment. FIG. 3 to be referenced is a diagram illustrating the configuration of a development device included in the image forming apparatus in FIG. 2. Note that the drawings schematically illustrate elements of configuration in order to facilitate understanding and properties of elements of configuration illustrated in the drawings, such as size, shape, and number thereof, may differ from actual properties thereof in order to facilitate preparation of the drawings.

As illustrated in FIG. 2, an image forming apparatus 100 is a printer adopting the non-magnetic one-component development process for forming an image on a sheet P that is a recording medium. The image forming apparatus 100 includes a feeding section 15, a conveyance section 20, an image forming section 30, and an ejection section 80.

The feeding section 15 includes a cassette 16 that accommodates a plurality of sheets P. The sheets P each are a sheet of paper or a synthetic resin sheet, for example. The feeding section 15 feeds the sheets P to the conveyance section 20 one at a time. The conveyance section 20 conveys the sheet P to the image forming section 30. The image forming section 30 forms an image on the sheet P. The conveyance section 20 conveys the sheet P with the image formed thereon to the ejection section 80. The ejection section 80 ejects the sheet P out of the image forming apparatus 100.

The image forming section 30 includes a light exposure unit 32, a first toner image generating unit 34A, a second toner image generating unit 34B, a third toner image generating unit 34C, a fourth toner image generating unit 34D, a first toner container 36A, a second toner container 36B, a third toner container 36C, a fourth toner container 36D, an intermediate transfer belt 62, a secondary transfer roller 64, and a fixing device 70. Here, the image forming apparatus 100 is a tandem image forming apparatus in which the first toner image generating unit 34A, the second toner image generating unit 34B, the third toner image generating unit 34C, and the fourth toner image generating unit 34D are arranged linearly along the intermediate transfer belt 62.

Note that in order to avoid redundancy in the following description of the present specification, the first toner image generating unit 34A, the second toner image generating unit 34B, the third toner image generating unit 34C, and the fourth toner image generating unit 34D may be respectively referred to as toner image generating unit 34A, toner image generating unit 34B, toner image generating unit 34C, and toner image generating unit 34D. Similarly, the first toner container 36A, the second toner container 36B, the third toner container 36C, and the fourth toner container 36D may be respectively referred to as toner container 36A, toner container 36B, toner container 36C, and toner container 36D.

The light exposure unit 32 irradiates each of the toner image generating units 34A to 34D with light based on image data to form an electrostatic latent image in each of the toner image generating units 34A to 34D.

The toner image generating unit 34A forms a yellow toner image based on the electrostatic latent image. The toner image generating unit 34B forms a cyan toner image based on the electrostatic latent image. The toner image generating unit 34C forms a magenta toner image based on the electrostatic latent image. The toner image generating unit 34D forms a black toner image based on the electrostatic latent image.

The toner container 36A contains a toner for yellow toner image formation. The toner container 36B contains a toner for cyan toner image formation. The toner container 36C contains a toner for magenta toner image formation. The toner container 36D contains a toner for black toner image formation. Each of the toners contained in the toner containers 36A to 36D is the toner (toner T illustrated in FIG. 3) according to the first embodiment.

The intermediate transfer belt 62 circulates in a direction indicated by an arrow R1. The toner images in the four colors are sequentially transferred from the respective toner image generating units 34A to 34D to the outer surface of the intermediate transfer belt 62. The secondary transfer roller 64 transfers the toner images formed on the outer surface of the intermediate transfer belt 62 to the sheet P. The fixing device 70 fixes the toner images to the sheet P by applying heat and pressure to the sheet P.

The outline of the configuration of the image forming apparatus 100 has been described so far. The details of the configuration of the image forming apparatus 100 will be described next. In the following, each of the toner image generating unit 34A, the toner image generating unit 34B, the toner image generating unit 34C, and the toner image generating unit 34D is referred to as toner image generating unit 34 where there is no need to distinguish therebetween.

The toner image generating unit 34 includes a photosensitive drum 40 that is an image bearing member, a charger 42, a development device 50, a primary transfer roller 44, a static eliminator 46, and a cleaner 48. In the toner image generating unit 34, the charger 42, the development device 50, the primary transfer roller 44, the static eliminator 46, and the cleaner 48 are disposed in the stated order along the circumferential surface of the photosensitive drum 40.

The photosensitive drum 40 is disposed so as to be in contact with the outer surface of the intermediate transfer belt 62. The primary transfer roller 44 is disposed opposite to the photosensitive drum 40 with the intermediate transfer belt 62 therebetween.

The photosensitive drum 40 rotates in a direction indicated by an arrow R2. The charger 42 charges the circumferential surface of the photosensitive drum 40. The circumferential surface of the photosensitive drum 40 is irradiated with light by the light exposure unit 32, thereby forming an electrostatic latent image.

Examples of the photosensitive drum 40 that can be used include a photosensitive member including a photosensitive layer containing amorphous silicon and a photosensitive member including a photosensitive layer containing an organic photoconductor.

As illustrated in FIG. 3, the development device 50 includes a development roller 52 that is a toner bearing member, a layer-thickness limiting blade 54 that is a layer-thickness limiting member, a supply roller 56, a stirring member 58, and a casing 60. The development device 50 develops an electrostatic latent image formed on the circumferential surface of the photosensitive drum 40 in a manner to attach the toner T to the electrostatic latent image by supplying the toner T to the electrostatic latent image. In the manner described above, a toner image is formed on the circumferential surface of the photosensitive drum 40.

The development roller 52 bears the toner T. The toner T is the toner (a non-magnetic one-component developer) of the first embodiment described previously. The toner T is supplied from a corresponding one of the toner containers (any of the toner containers 36A to 36D illustrated in FIG. 2). The development roller 52 is disposed so as to be in contact with the photosensitive drum 40 in a manner to be rotationally driven in a direction indicated by an arrow R3 as the photosensitive drum 40 rotates. The development roller 52 supplies the borne toner T to the photosensitive drum 40.

The layer-thickness limiting blade 54 limits the thickness of a toner layer (not illustrated) formed with the toner T. The toner layer is formed on the development roller 52. The layer-thickness limiting blade 54 is in contact at one end thereof with the circumferential surface of the development roller 52. The layer-thickness limiting blade 54 is for example a leaf spring and pressed toward the development roller 52 at a specific pressure. Examples of a constitutional material of the layer-thickness limiting blade 54 include resins (specific examples include silicone resin and urethane resin), metals (specific examples include stainless steel, aluminum, copper, brass, and phosphor bronze), and composite materials of these.

The supply roller 56 supplies the toner T to the development roller 52. The supply roller 56 is in contact with the development roller 52 and supported in a manner to rotate in a direction indicated by an arrow R4.

The stirring member 58 conveys the toner T toward the supply roller 56 while stirring the toner T. The casing 60 houses each member of the development device 50 and the toner T.

The development device 50 develops an electrostatic latent image formed on the circumferential surface of the photosensitive drum 40 into a toner image by supplying the toner T (specifically, the toner T included in the toner layer) to the electrostatic latent image while forming the toner layer using the layer-thickness limiting blade 54 in contact with the development roller 52.

The details of the configuration of the image forming apparatus 100 will be further described with reference to FIG. 2. The primary transfer roller 44 transfers the toner image formed on the circumferential surface of the photosensitive drum 40 to the outer surface of the intermediate transfer belt 62. The static eliminator 46 performs electrostatic elimination on the circumferential surface of the photosensitive drum 40 after transfer of the toner image to the intermediate transfer belt 62. The cleaner 48 removes residual toner T remaining on the circumferential surface of the photosensitive drum 40. The cleaner 48 includes a cleaning blade, for example.

The toner images sequentially transferred to the outer surface of the intermediate transfer belt 62 in a superimposed manner are transferred to the sheet P by the secondary transfer roller 64. That is, the secondary transfer roller 64 corresponds to a transfer section that transfers the toner images formed on the circumferential surfaces of the respective photosensitive drums 40 to the sheet P via the intermediate transfer belt 62. The sheet P to which the toner images have been transferred is conveyed to the fixing device 70 by the conveyance section 20. The fixing device 70 includes a pressure roller 72 and a fixing belt 74. Here, the pressure roller 72 applies pressure to the toner images transferred to the sheet P and the fixing belt 74 applies heat to the toner images transferred to the sheet P. Note that a fixing roller may be used instead of the fixing belt 74. The sheet P conveyed to the fixing device 70 receives heat and pressure at a location between the pressure roller 72 and the fixing belt 74. In the manner described above, the toner images (an image) are fixed to the sheet P. Thereafter, the sheet P is ejected out of the image forming apparatus 100 from the ejection section 80. In the manner described above, the image forming apparatus 100 forms an image on a sheet P.

The image forming apparatus 100 uses the toner of the first embodiment as a non-magnetic one-component developer. This can inhibit production of image defects in an image formed with the toner of the first embodiment.

An example of the image forming apparatus of the second embodiment has been described so far. However, the image forming apparatus according to the present disclosure is not limited to the above-described image forming apparatus 100. For example, the image forming apparatus according to the present disclosure may be a monochrome image forming apparatus. The monochrome image forming apparatus includes for example one toner image forming unit and one toner container. Alternatively, the image forming apparatus according to the present discloser may be an image forming apparatus adopting a direct transfer process. In the image forming apparatus adopting the direct transfer process, the transfer section directly transfers the toner images on the image bearing members to a recording medium.

Third Embodiment: Image Formation Method

An image formation method according to a third embodiment of the present disclosure will be described next. The image formation method of the third embodiment is a method for forming an image using the image forming apparatus of the second embodiment described previously, for example. The image formation method of the third embodiment includes forming an electrostatic latent image and developing. The image formation method of the third embodiment may additionally include any processes (additional processes) in addition to the forming an electrostatic latent image and the developing. Examples of the additional processes include transferring and fixing. A preferable example of the image formation method of the third embodiment will be described below.

The preferable example of the image formation method of the third embodiment includes forming an electrostatic latent image, developing, transferring, and fixing.

In the forming an electrostatic latent image, an electrostatic latent image is formed on the surface of an image bearing member (e.g., the photosensitive drum 40 illustrated in FIG. 2). In the developing, the electrostatic latent image is developed into a toner image by supplying toner to the electrostatic latent image while forming a toner layer using a layer-thickness limiting member (e.g., the layer-thickness limiting blade 54 illustrated in FIG. 3) in contact with a toner bearing member (e.g., the development roller 52 illustrated in FIG. 3.). In the developing, toner (the toner supplied to the electrostatic latent image) forming the toner layer is the toner (non-magnetic one-component developer) of the first embodiment described previously. In the transferring, the toner image formed by supplying the toner to the electrostatic latent image is transferred to a recording medium (e.g., the sheet P illustrated in FIG. 2). In the fixing, the transferred toner image is fixed to the recording medium (e.g., the sheet P illustrated in FIG. 2).

The preferable example of the image formation method of the third embodiment uses the toner of the first embodiment as a non-magnetic one-component developer, thereby achieving inhibition of production of image defects in an image formed with the toner.

EXAMPLES

The following describes examples of the present disclosure. However, the present disclosure is not limited to the scope of the examples.

Preparation of Fluorine-Containing Particles

Preparation of Fluorine-Containing Particles F1

Fluorine-containing particles F1 are prepared according to a preparatory process, a polymerization process, and a precipitation process described below.

(Preparatory Process)

An autoclave equipped with an anchor type stainless steel stirring vane and a temperature-adjustable jacket was charged with 3.5 L of ion exchange water, 5 g of ammonium perfluorohexanoate, and 35 g of a paraffin wax ("PARAFFIN WAX-115", product of Nippon Seiro Co., Ltd.). Then, the autoclave was purged with a nitrogen gas and a tetrafluoroethylene gas while the internal temperature of the autoclave was kept at 45° C.

(Polymerization Process)

Next, an aqueous solution of ammonium persulfate (specifically, an aqueous solution obtained by dissolving 400 mg of ammonium persulfate in 25 mL of ion exchange water) being an aqueous solution of a polymerization initiator was injected into the autoclave, and a tetrafluoroethylene gas was continuously supplied into the autoclave to cause a polymerization reaction of tetrafluoroethylene. During the polymerization reaction, the autoclave contents were kept being stirred at a rotational speed of 250 rpm while the internal temperature of the autoclave was kept at 45° C. Furthermore, the internal pressure of the autoclave was kept at 0.80 t 0.05 MPa during the polymerization reaction. After 60 minutes elapsed from the start (stirring start of the autoclave contents) of the injection of the aqueous solution of the polymerization initiator, supply of the tetrafluoroethylene gas was stopped and the stirring of the autoclave contents was stopped to cease the polymerization reaction. In the following, a time from the start of the injection of the aqueous solution of the polymerization initiator (stirring start of the autoclave contents) to the stop of the supply of the tetrafluoroethylene gas (stirring stop of the autoclave contents) is referred to as polymerization time.

(Precipitation Process)

Next, 20 mL of concentrated nitric acid at a concentration of 60% by mass was added to 3000 g of a dispersion (the autoclave contents) obtained through the above-described polymerization process, and the dispersion to which the concentrated nitric acid had been added was stirred for 1 hour at a rotational speed of 500 rpm to precipitate a polymer (PTFE).

Subsequently, the dispersion after the precipitation was solid-liquid separated and the resultant solid was dried. In the manner described above, a powder of the fluorine-containing particles F1 being PTFE particles was obtained. The fluorine-containing particles F1 had a number average primary particle diameter of 85 nm.

Preparation of Fluorine-Containing Particles F2

A powder of fluorine-containing particles F2 was obtained according to the same method as that for preparing the fluorine-containing particles F1 in all aspects other than change of the polymerization time to 30 minutes in the polymerization process and change of the rotational speed (stirring speed) to 400 rpm in the dispersion stirring in the precipitation process. The fluorine-containing particles F2 had a number average primary particle diameter of 50 nm.

Preparation of Fluorine-Containing Particles F3

A powder of fluorine-containing particles F3 was obtained according to the same method as that for preparing the fluorine-containing particles F1 in all aspects other than change of the polymerization time to 150 minutes in the polymerization process and change of the rotational speed (stirring speed) to 600 rpm in the dispersion stirring in the precipitation process. The fluorine-containing particles F3 had a number average primary particle diameter of 500 nm.

Preparation of Fluorine-Containing Particles F4

PFA particles ("PFA-945HP-Plus", product of Chemours-Mitsui Fluoroproducts Co., Ltd.) were prepared as fluorine-containing particles F4. The fluorine-containing particles F4 had a number average primary particle diameter of 100 nm.

Preparation of Fluorine-Containing Particles F5

A container was charged with 100 mL of toluene, 20 g of 3,3,3-trifluoropropyltrimethoxysilane, and 100 g of silica base particles ("E-743", product of TOSOH SILICA CORPORATION, number average primary particle diameter: 80 nm. BET specific surface area: 45 $m^2/g$), and the container contents were stirred for 60 minutes. Next, the container contents were heated (dried) under conditions of a heating temperature of 120° C. and a heating time of 5 hours. Next, the resultant dried product was broken up using a pin mill. In the manner described above, a powder of fluorine-containing particles F5 with a number average primary particle diameter of 82 nm was obtained. The fluorine-containing particles F5 each included a silica base particle and a surface-treated layer present on the surface of the silica base particle. Furthermore, the surface-treated layers of the fluorine-containing particles F5 contained a fluorine atom derived from 3,3,3-trifluoropropyltrimethoxysilane.

Preparation of Fluorine-Containing Particles F6

A stainless steel container was charged with 100 g of silica base particles ("E-743", product of TOSOH SILICA CORPORATION, number average primary particle diameter: 80 nm, BET specific surface area: 45 $m^2/g$). Next, 18 g of a fluorine-modified silicone oil ("FL-100", product of Shin-Etsu Chemical Co., Ltd.) and 10 mL of n-hexane were sprayed toward the container contents while the container contents were stirred in a nitrogen atmosphere at room temperature (temperature: 25° C.). Next, the container contents were stirred for 30 minutes in the nitrogen atmosphere at room temperature (temperature: 25° C.). Next, the container contents were heated at a heating temperature of 100° C. for a heating time of 30 minutes under stirring, and then heated at a heating temperature of 200° C. for a heating time of 1 hour. Next, the container contents were cooled. In the manner described above, a powder of fluorine-containing particles F6 with a number average primary particle diameter of 83 nm was obtained. The fluorine-containing particles F6 each included a silica base particle and a surface-treated layer present on the surface of the silica base particle. Furthermore, the surface-treated layers of the fluorine-containing particles F6 contained a fluorine atom derived from the fluorine-modified silicone oil.

<Toner Production>

The following describes production methods of toners TA-1 to TA-11 and TB-1 to TB-9.

Production of Toner TA-1

(Toner Mother Particle Preparation)

An FM mixer ("FM-10C/I", product of Nippon Coke & Engineering Co., Ltd.) was charged with 87 parts by mass of a polyester resin ("HP-313", product of Mitsubishi Chemical Corporation) being the binder resin, 3 parts by mass of a carbon black ("MA100", product of Mitsubishi Chemical Corporation) being the colorant, 2 parts by mass of a positively chargeable charge control agent ("BONTRON (registered Japanese trademark) N-71", product of ORIENT CHEMICAL INDUSTRIES, Co., Ltd.), 4 parts by mass of a positively chargeable charge control agent ("ACRYBASE (registered Japanese trademark) FCA-201-PS", product of FUJIKURA KASEI CO., LTD.), and 4 parts by mass of a caranuba wax (product of TOA KASEI CO., LTD.) being the releasing agent. These materials were mixed for 4 minutes using the FM mixer at a rotational speed of 3000 rpm.

Subsequently, the resultant mixture was melt-kneaded using a twin screw extruder ("TEM-26SS", product of Toshiba machine Co., Ltd.) under conditions of a material feeding speed of 50 g/min., a shaft rotational speed of 100 rpm, and a melt-kneading temperature (cylinder temperature) of 120° C. The resultant melt-kneaded product was cooled then. Subsequently, the cooled melt-kneaded product was coarsely pulverized using a pulverizer ("ROTOPLEX (registered Japanese trademark)", product of Hosokawa Micron Corporation) under a condition of a set particle diameter of 2 mm. Subsequently, the resultant coarsely pulverized product was finely pulverized using a pulverizer ("TURBO MILL Type RS", product of FREUND-TURBO CORPORATION). Subsequently, the resultant finely pulverized product was classified using a classifier ("ELBOW JET Type EJ-LABO", product of Nittetsu Mining Co., Ltd.). As a result, toner mother particles with a volume median diameter ($D_{50}$) of 7.0 μm were obtained.

(First External Additive Addition)

An FM mixer (FM-10B", product of Nippon Coke & Engineering Co., Ltd.) was charged with 100 parts by mass of the toner mother particles (toner mother particles prepared by the toner mother particle preparation described above), 1.50 parts by mass of hydrophobic silica particles ("CAB-O-SIL (registered Japanese trademark) TG-308F", product of Cabot Corporation), and 1.00 part by mass of titanium oxide particles ("MT-500B", product of TAYCA CORPORATION). Next, the toner mother particles, the hydrophobic silica particles, and the titanium oxide particles were mixed for 5 minutes using the FM mixer under conditions of a rotational speed of 3500 rpm and a jacket temperature of 20° C.

(Second External Additive Addition)

Subsequently, 0.20 parts by mass of the fluorine-containing particles F1 were added into the FM mixer and the materials in the FM mixer were mixed for 0.1 minutes using the FM mixer under conditions of a rotational speed of 3500 rpm and a jacket temperature of 20° C. Through the above, all amounts of the external additives (the hydrophobic silica particles, the titanium oxide particles, and the fluorine-containing particles F1) were attached to the surfaces of the toner mother particles.

Subsequently, the resultant powder was sifted using a 200-mesh sieve (opening 75 μm). As a result, a positively chargeable toner TA-1 was obtained. Note that the composition ratio of the components of the toner did not change before and after the sifting.

Production of Toners TA-2 to TA-11 and TB-2 to TB-9

Positively chargeable toners TA-2 to TA-11 and TB-2 to TB-9 were produced according to the same method as that for producing the toner TA-1 in all aspects other than the type of the fluorine-containing particles, the amount of the fluorine-containing particles used, and the mixing time in the second external additive addition were changed as shown in Table 1 described later.

Production of Toner TB-1

A positively chargeable toner TB-1 was produced according to the same method as that for production of the toner TA-1 in all aspects other than that the second external additive addition was not performed.

<Measurement of Fluorine Attachment Rate>

A columnar pellet with a diameter of 20 mm was produced by press-molding 2 g of a toner (any of the toners TA-1 to TA-11 and TB-2 to TB-9) being a measurement target using a press molding machine under conditions of a pressure of 2 MPa and a pressing time of 1 minute. Subsequently, X-ray fluorescence analysis was performed on the resultant pellet using an X-ray fluorescence analyzer ("ZSX Primus IV", product of Rigaku Corporation) under conditions of a tube voltage of 40 kV and a tube current of 70 mA to plot an X-ray fluorescence spectrum (horizontal axis: energy, vertical axis: intensity (number of photons)) exhibiting a peak derived from F (fluorine). In the following, intensity of the peak derived from F (fluorine) in the plotted X-ray fluorescence spectrum is referred to as "$X_A$". $X_A$ corresponds to a value obtained by converting the amount (amount of fluorine-containing particles attached to the toner mother particles) of fluorine-containing particles attached before specific ultrasonication into a peak intensity of the X-ray fluorescence spectrum. Thereafter, $X_A$ was converted into an amount (also referred to below as $F_{before}$) of the fluorine-containing particles attached to the toner mother particles using a calibration curve (calibration curve indicating the relationship between the amount of the fluorine-containing particles and intensity of the peak derived from F) plotted for a toner including a known amount of the fluorine-containing particles.

Next, 5 g of a toner (any of the toners TA1 to TA-11 and TB-2 to TB-9) of the same type as the toner for which $X_A$ has been measured and 50 g of poly(oxyethylene)octylphenyl ether (product of FUJIFILM Wako Pure Chemical Corporation, average number of moles added of ethylene oxide: 9) being a nonionic surfactant were added to a specific amount of ion exchange water to obtain 500 mL of a water-based dispersion (dispersion containing the toner, the nonionic surfactant, and the ion exchange water). Next, the specific ultrasonication was performed in the resultant water-based dispersion (temperature: 25° C.) using an ultrasonic generator ("UPW0228A1H", product of Ultrasonic Engineering Co., Ltd.). Here, the specific ultrasonication was application of ultrasonic oscillation at an output of 200 W, a frequency of 28 kHz, and an amplitude (peak to peak value) of 25 μm for 5 minutes in the water-based dispersion. Note that the specific ultrasonication was performed in a state in which the ultrasonic generator was secured at the central part of the water surface of the water-based dispersion added into a flask with a capacity of 600 mL (body diameter 90 mm×height 125 mm). In securing the ultrasonic generator, the ultrasonic generator was secured such that the tip of a horn of the ultrasonic generator was located 50 mm below the water surface.

Next, the water-based dispersion subjected to the specific ultrasonication was filtered by suction using quantitative filter paper ("GRADE #3", product of Whatman plc, retained particle diameter: 6 μm). In the manner described above, a toner from which at least a portion of the fluorine-containing particles has been removed was obtained. Next, the resultant toner was dried. Then, an X-ray fluorescence spectrum of the toner after the specific ultrasonication being a measurement target was plotted using 2 g of the dried toner according to the same method as the above-described method for plotting the X-ray fluorescence spectrum. In the following, intensity of the peak derived from F (fluorine) on the fluorescent X-ray spectrum plotted herein is referred to as "$X_B$". $X_B$ corresponds to a value obtained by converting the residual amount ratio of remaining fluorine-containing particles remaining attached to the toner mother particles without detachment from the toner mother particles in the toner after the specific ultrasonication into a peak intensity of the X-ray fluorescence spectrum. Thereafter. $X_B$ was converted into a residual amount ratio (also referred to below as $F_{after}$) of the remaining fluorine-containing particles remaining attached to the toner mother particles without detachment from the toner mother particles using a calibration curve (calibration curve indicating the relationship between the amount of the fluorine-containing particles and intensity of the peak derived from F) plotted for a toner including a known amount of the fluorine-containing particles.

Subsequently, a fluorine attachment rate (unit: % by mass) of the toner being the measurement target was calculated from $F_{before}$ and $F_{after}$ using an expression "fluorine attachment rate=$100\times F_{after}/F_{before}$".

Table 1 shows the types of the fluorine-containing particles, the amounts of the fluorine-containing particles used, mixing times in the second external additive addition, and the fluorine attachment rates for the respective toners TA-1 to TA-11 and TB-2 to TB-9. Note that in Table 1, "Amount used" refers to an amount of corresponding fluorine-containing particles charged into the FM mixer relative to 100 parts by mass of the toner mother particles. The amounts used shown in Table 1 are the same as the fluorine attachment amounts (specifically, the amounts of the fluorine-containing particles relative to 100 parts by mass of the toner mother particles) of the corresponding toners being the measurement targets. Furthermore, "Mixing time" in Table 1 refers to a mixing time (time to mix the materials in the FM mixer) in the second additive addition.

TABLE 1

| Toner | Fluorine-containing particles | | Mixing | Fluorine |
|---|---|---|---|---|
| | Type | Amount used [part by mass] | time [minute] | attachment rate [% by mass] |
| TA-1 | F1 | 0.20 | 0.1 | 0 |
| TA-2 | F1 | 0.20 | 0.5 | 8 |
| TA-3 | F1 | 0.20 | 0.7 | 12 |
| TA-4 | F1 | 0.20 | 1.0 | 20 |
| TA-5 | F2 | 0.20 | 0.3 | 12 |
| TA-6 | F3 | 0.20 | 5.0 | 12 |
| TA-7 | F4 | 0.20 | 1.1 | 12 |
| TA-8 | F5 | 0.20 | 0.7 | 13 |
| TA-9 | F6 | 0.20 | 0.7 | 12 |
| TA-10 | F1 | 0.10 | 0.7 | 12 |
| TA-11 | F1 | 0.50 | 0.8 | 13 |
| TB-2 | F1 | 0.20 | 1.1 | 22 |
| TB-3 | F1 | 0.20 | 4.6 | 93 |
| TB-4 | F5 | 0.20 | 1.1 | 22 |
| TB-5 | F5 | 0.20 | 4.6 | 94 |
| TB-6 | F1 | 0.60 | 0.9 | 12 |
| TB-7 | F1 | 0.08 | 0.7 | 13 |
| TB-8 | F5 | 0.60 | 0.9 | 13 |
| TB-9 | F5 | 0.08 | 0.7 | 12 |

Evaluation Method

The following describes evaluation methods for the toners TA-1 to TA-11 and TB-1 to TB-9.

[Confirmation of Presence of Streaks]

An evaluation apparatus used was a modified version of a laser printer ("HL-1040", product of BROTHER INDUSTRIES, LTD.) equipped with a cleaning blade and adopting the non-magnetic one-component development process. Note that the material of the cleaning blade was a urethane resin and the thickness of the cleaning blade was 2 mm. Furthermore, the cleaning blade had a contact pressure of 1.8 g/mm and a contact angle of 16 degrees. An evaluation toner (evaluation target: any of the toners TA-1 to TA-11 and TB-1 to TB-9) was loaded into a development device of the evaluation apparatus. Next, an image with a printing rate of 5% was continuously printed on 2000 sheets of printing paper (A4-size plain paper) using the evaluation apparatus in an environment at a temperature of 32.5° C. and a relative humidity of 80%. Next, a halftone image (image density: 50%) was formed on the entirety of one sheet of printing paper (A4-size plain paper) using the evaluation apparatus in an environment at a temperature of 32.5° C. and a relative humidity of 80%. Thereafter, the formed image was visually observed. If no streaks (specifically, white lines) were present in the formed image, it was evaluated as "production of streaks being inhibited". If any streaks were present in the formed image by contrast, it was evaluated as "production of streaks not being inhibited".

[Filming Resistance]

The modified version used in [Confirmation of Presence of Streaks] was used as an evaluation apparatus. An evaluation toner (evaluation target: any of the toners TA-1 to TA-11 and TB-1 to TB-9) was loaded into the development device of the evaluation apparatus. Next, an image with a printing rate of 5% was continuously printed on 2000 sheets of printing paper (A4-size plain paper) using the evaluation apparatus in an environment at a temperature of 32.5° C. and a relative humidity of 80%. Next, the presence or absence of an adhering material to the surface of a photosensitive drum of the evaluation apparatus was confirmed using a digital microscope ("VHX-6000", product of Keyence Corporation, magnification: 1000×). If no adhering materials were present, it was evaluated as A (excellent in filming resistance). If any adhering materials were present, it was evaluated as B (poor in filming resistance).

[Abrasion Amount of Photosensitive Layer]

The modified version used in [Confirmation of Presence of Streaks] was used as an evaluation apparatus. First, an average thickness of a photosensitive layer of the photosensitive drum provided in the evaluation apparatus was measured according to the later-described method. In the following, the average thickness of the photosensitive layer measured herein is referred to as $T_1$. Next, an evaluation toner (evaluation target: any of the toners TA-1 to TA-11 and TB-1 to TB-9) was loaded into the development device of the evaluation apparatus. Next, an image with a printing rate of 5% was continuously printed on 2000 sheets of printing paper (A4-size plain paper) using the evaluation apparatus in an environment at a temperature of 32.5° C. and a relative humidity of 80%. Thereafter, an average thickness of the photosensitive layer of the photosensitive drum provided in the evaluation apparatus was measured according to the later-described method. In the following, the average thickness of the photosensitive layer measured herein is referred to as $T_2$. Then, an abrasion amount (unit: nm) of the photosensitive layer was calculated using an equation "abrasion amount of photosensitive layer=$T_1-T_2$". If the abrasion amount of the photosensitive layer was no greater than 20 nm, it was evaluated as "abrasion of the photosensitive layer being inhibited". If the abrasion amount of the photosensitive layer was greater than 20 nm by contrast, it was evaluated as "abrasion of the photosensitive layer not being inhibited".

(Method for Measuring Average Thickness of Photosensitive Layer)

The thicknesses at 80 locations in total of the photosensitive layer were measured using an eddy current coating thickness gauge ("FISCHERSCOPE (registered Japanese trademark) MMS (registered Japanese trademark) Type 3AM", product of HELMUT FISCHER GMBH). The 80 locations of the photosensitive layer included 20 points at equal intervals in the axial direction of the photosensitive drum at each 4 locations at equal angles in the circumferential direction of the photosensitive drum. An arithmetic mean of the measured 80 values obtained as above was taken to be an average thickness of the photosensitive layer.

[Fogging Density]

The modified version used in [Confirmation of Presence of Streaks] was used as an evaluation apparatus. An evaluation toner (evaluation target: any of the toners TA-1 to TA-11 and TB-1 to TB-9) was loaded into the development device of the evaluation apparatus. Next, an image with a printing rate of 5% was continuously printed on 2000 sheets of printing paper (A4-size plain paper) using the evaluation apparatus in an environment at a temperature of 32.5° C. and a relative humidity of 80%. Next, an image with a printing rate of 5% was printed on a sheet of printing paper (A4-size plain paper) using the evaluation apparatus in an environment at a temperature of 32.5° C. and a relative humidity of 80%. Thus, an evaluation image was obtained. An image density (ID) of a blank part of the obtained evaluation image was measured using a reflectance densitometer ("RD918", product of X-Rite Inc.) and a fogging density (FD) was calculated. Note that the fogging density (FD) corresponds to a value obtained by subtracting an image density (ID) of base paper (unprinted paper) from the image density (ID) of the blank part of the evaluation image.

If the fogging density (FD) was less than 0.010, it was evaluated as "occurrence of fogging being inhibited". If the fogging density (FD) was 0.010 or more by contrast, it was evaluated as "occurrence of fogging not being inhibited".

[Amount of Charge]

The modified version used in [Confirmation of Presence of Streaks] was used as an evaluation apparatus. An evaluation toner (evaluation target: any of the toners TA-1 to TA-11 and TB-1 to TB-9) was loaded into the development device of the evaluation apparatus. Next, an image with a printing rate of 5% was continuously printed on 2000 sheets of printing paper (A4-size plain paper) using the evaluation apparatus in an environment at a temperature of 32.5° C. and a relative humidity of 80%. Next, the development device was taken out of the evaluation apparatus and toner adhering to a development sleeve of the development device was sucked using a compact toner draw-off charge measurement system ("MODEL 212HS", product of TREK, INC.) in an environment at a temperature of 32.5° C. and a relative humidity of 80%. Then, the amount of charge (unit: μC/g) of the sucked toner was measured. If the measured amount of charge was at least 10 μC/g and no greater than 25 μC/g, it was evaluated as "good". If the measured amount of charge was less than 10 μC/g or greater than 25 μC/g by contrast, it was evaluated as "poor".

[Peeling Length]

An image forming apparatus was used as an evaluation apparatus. The image forming apparatus was obtained by modifying the modified version used in [Confirmation of Presence of Streaks] so that the fixing temperature was changeable. An evaluation toner (evaluation target: any of the toners TA-1 to TA-11 and TB-1 to TB-9) was loaded into a development device of the evaluation apparatus. Next, a solid image (specifically, an unfixed toner image before passing through a fixing device) with a size of 20 mm by 30 mm was formed on printing paper (A4-size plain paper) under a condition of a toner application amount of 9.8 $mg/cm^2$ using the evaluation apparatus in an environment at a temperature of 32.5° C. and a relative humidity of 80%. Subsequently, the printing paper with the solid image formed thereon was allowed to pass through the fixing device of the evaluation apparatus. In allowing the printing paper to pass through the fixing device, the fixing temperature of the fixing device was set to 160° C. Thereafter, fixing or non-fixing of the solid image after the allowing the printing paper to pass through the fixing device was determined.

Whether or not the toner has been fixed was confirmed by the following fold-rubbing test. Specifically, the fold-rubbing test was performed by folding the printing paper having passed through the fixing device in half such that the surface with the image formed thereon was folded inwards and such that a fold was formed at the center of the image, and by rubbing a 1-kg brass weight covered with cloth back and forth on the fold 5 times. Subsequently, the printing paper was unfolded and the folded part (part in which the solid image has been formed) of the printing paper was observed. The length (peeling length) of peeling of the toner at the folded part was measured. If the peeling length was less than 1.0 mm, it was evaluated as "low-temperature fixability being ensured". If the peeling length was 1.0 mm or more by contrast, it was evaluated as "low-temperature fixability not being ensured".

Evaluation Result

Table 2 shows the presence or absence of streaks, the filming resistance, and the abrasion amount of the photosensitive layer for each of the toners TA-1 to TA-11 and TB-1 to TB-9. Furthermore, Table 3 shows the fogging density (FD), the amount of charge, and the peeling length for each of the toners TA-1 to TA-11 and TB-1 to TB-9.

TABLE 2

| | Toner | Presence or absence of streaks | Filming resistance | Abrasion amount of photosensitive layer |
|---|---|---|---|---|
| Example 1 | TA-1 | Absent | A | No greater than 20 nm |
| Example 2 | TA-2 | Absent | A | No greater than 20 nm |
| Example 3 | TA-3 | Absent | A | No greater than 20 nm |
| Example 4 | TA-4 | Absent | A | No greater than 20 nm |
| Example 5 | TA-5 | Absent | A | No greater than 20 nm |
| Example 6 | TA-6 | Absent | A | No greater than 20 nm |
| Example 7 | TA-7 | Absent | A | No greater than 20 nm |
| Example 8 | TA-8 | Absent | A | No greater than 20 nm |
| Example 9 | TA-9 | Absent | A | No greater than 20 nm |
| Example 10 | TA-10 | Absent | A | No greater than 20 nm |
| Example 11 | TA-11 | Absent | A | No greater than 20 nm |
| Comparative Example 1 | TB-1 | Present | A | Greater than 20 nm |
| Comparative Example 2 | TB-2 | Present | A | Greater than 20 nm |
| Comparative Example 3 | TB-3 | Present | A | Greater than 20 nm |
| Comparative Example 4 | TB-4 | Present | A | Greater than 20 nm |
| Comparative Example 5 | TB-5 | Present | A | Greater than 20 nm |
| Comparative Example 6 | TB-6 | Absent | B | No greater than 20 nm |
| Comparative Example 7 | TB-7 | Present | A | Greater than 20 nm |
| Comparative Example 8 | TB-8 | Absent | B | No greater than 20 nm |
| Comparative Example 9 | TB-9 | Present | A | Greater than 20 nm |

TABLE 2

| | Toner | Fogging density | Amount of charge [μC/g] | Peeling length [mm] |
|---|---|---|---|---|
| Example 1 | TA-1 | 0.000 | 21 | 0.1 |
| Example 2 | TA-2 | 0.000 | 20 | 0.3 |
| Example 3 | TA-3 | 0.002 | 18 | 0.5 |
| Example 4 | TA-4 | 0.005 | 15 | 0.7 |
| Example 5 | TA-5 | 0.001 | 19 | 0.5 |
| Example 6 | TA-6 | 0.002 | 18 | 0.5 |
| Example 7 | TA-7 | 0.002 | 18 | 0.5 |
| Example 8 | TA-8 | 0.003 | 17 | 0.7 |
| Example 9 | TA-9 | 0.002 | 18 | 0.7 |
| Example 10 | TA-10 | 0.001 | 19 | 0.2 |
| Example 11 | TA-11 | 0.002 | 18 | 0.9 |
| Comparative Example 1 | TB-1 | 0.009 | 10 | 0.1 |
| Comparative Example 2 | TB-2 | 0.006 | 15 | 1.1 |
| Comparative Example 3 | TB-3 | 0.012 | 8 | 1.6 |
| Comparative Example 4 | TB-4 | 0.007 | 14 | 1.2 |
| Comparative Example 5 | TB-5 | 0.014 | 7 | 1.6 |
| Comparative Example 6 | TB-6 | 0.004 | 17 | 1.4 |
| Comparative Example 7 | TB-7 | 0.009 | 10 | 0.2 |
| Comparative Example 8 | TB-8 | 0.006 | 15 | 1.4 |
| Comparative Example 9 | TB-9 | 0.009 | 10 | 0.2 |

In each of the toners TA-1 to TA-11, the external additive contained fluorine-containing particles. Each of the toners TA-1 to TA-11 had a fluorine attachment amount of at least 0.10 parts by mass and no greater than 0.50 parts by mass. As shown in Table 1, each of the toners TA-1 to TA-11 had a fluorine attachment rate of at least 0% by mass and no greater than 20% by mass.

As shown in Table 2, no streaks were present in the formed image when any of the toners of the toners TA1- to TA-11 was used. Consequently, production of streaks was inhibited when any of the toners TA-1 to TA-11 was used.

As shown in Table 3, each of the toners TA-1 to TA-11 had a fogging density (FD) of less than 0.010. Consequently, occurrence of fogging was inhibited when any of the toners TA-1 to TA-11 was used. With respect to each of the toners TA-1 to TA-11, the peeling length was less than 1.0 mm. Consequently, low-temperature fixability of each of the toners TA-1 to TA-11 was ensured.

In the toner TB-1, the external additive contained no fluorine-containing particles. As shown in Table 1, each of the toners TB-2 to TB-5 had a fluorine attachment rate of greater than 20% by mass. Each of the toners TB-6 and TB-8 had a fluorine attachment amount of greater than 0.50 parts by mass. Each of the toners TB-7 and TB-9 had a fluorine attachment amount of less than 0.10 parts by mass.

As shown in Table 2, a streak was present in the formed image when any of the toners TB-1 to TB-5, TB-7, and TB-9 was used. Consequently, production of streaks was not inhibited when any of the toners TB-1 to TB-5, TB-7, and TB-9 was used.

As shown in Table 3, each of the toners TB-3 and TB-5 had a fogging density (FD) of 0.010 or more. Consequently, occurrence of fogging was not inhibited when either of the toners TB-3 and TB-5 was used. Each of the toners TB-2 to TB-6 and TB-8 had a peeling length of 1.0 mm or more. Consequently, low-temperature fixability of any of the toners TB-2 to TB-6 and TB-8 was not ensured.

From the above results, it was demonstrated that when the toner according to the present disclosure was used, production of image defects can be inhibited in image formation by the non-magnetic one-component development process while low-temperature fixability can be ensured.

What is claimed is:

1. A toner comprising toner particles, wherein the toner is used for a non-magnetic one-component development, the toner particles each include a toner mother particle containing a binder resin and an external additive attached to a surface of the toner mother particle, the external additive includes fluorine-containing particles, the fluorine-containing particles contain a fluorine atom at least in surface layers thereof, an amount of the fluorine-containing particles is at least 0.10 parts by mass and no greater than 0.20 parts by mass relative to 100 parts by mass of the toner mother particles, and when ultrasonication is performed, a residual amount ratio of remaining fluorine-containing particles is at least 0% by mass and no greater than 20% by mass relative to the amount of the fluorine-containing particles attached to the toner mother particles before the ultrasonication, the ultrasonication being application of ultrasonic oscillation at an output of 200 W, a frequency of 28 kHz, and an amplitude of 25 μm for 5 minutes in 500 mL of a water-based dispersion containing 5 g of the toner and 50 g of a nonionic surfactant.

2. The toner according to claim 1, wherein
the fluorine-containing particles have a number average primary particle diameter of at least 50 nm and no greater than 500 nm.
3. The toner according to claim 1, wherein
the fluorine-containing particles are fluororesin particles.
4. The toner according to claim 3, wherein
the fluororesin particles are polytetrafluoroethylene particles or perfluoro alkoxy alkane particles.
5. The toner according to claim 1, wherein
the fluorine-containing particles each include a silica base particle and a surface-treated layer present on a surface of the silica base particle, and
the surface-treated layer contains a fluorine atom derived from a fluorine-containing silane coupling agent or a fluorine atom derived from a fluorine-modified silicone oil.
6. An image forming apparatus comprising:
an image bearing member; and
a development device configured to develop an electrostatic latent image formed on a surface of the image bearing member by supplying a non-magnetic one-component developer to the electrostatic latent image, wherein
the non-magnetic one-component developer is the toner according to claim 1,
the development device includes a toner bearing member that bears the toner and a layer-thickness limiting member that limits thickness of a toner layer formed with the toner, and
the development device supplies the toner to the electrostatic latent image while forming the toner layer using the layer-thickness limiting member in contact with the toner bearing member.

7. An image formation method using the toner according to claim 1 as a non-magnetic one-component developer, the method comprising:
forming an electrostatic latent image on a surface of an image bearing member; and
developing the electrostatic latent image by supplying the toner to the electrostatic latent image while forming a toner layer formed with the toner using a layer-thickness limiting member in contact with a toner bearing member.

* * * * *